Figure 8:
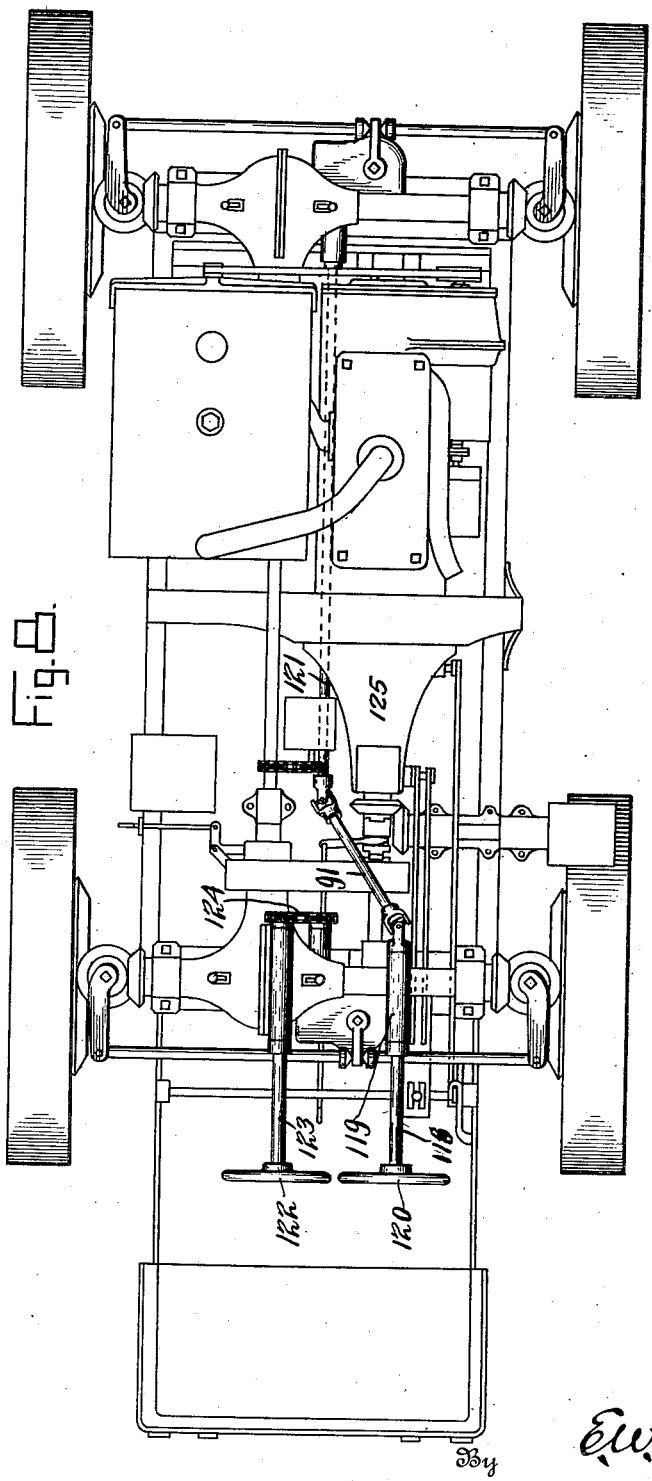

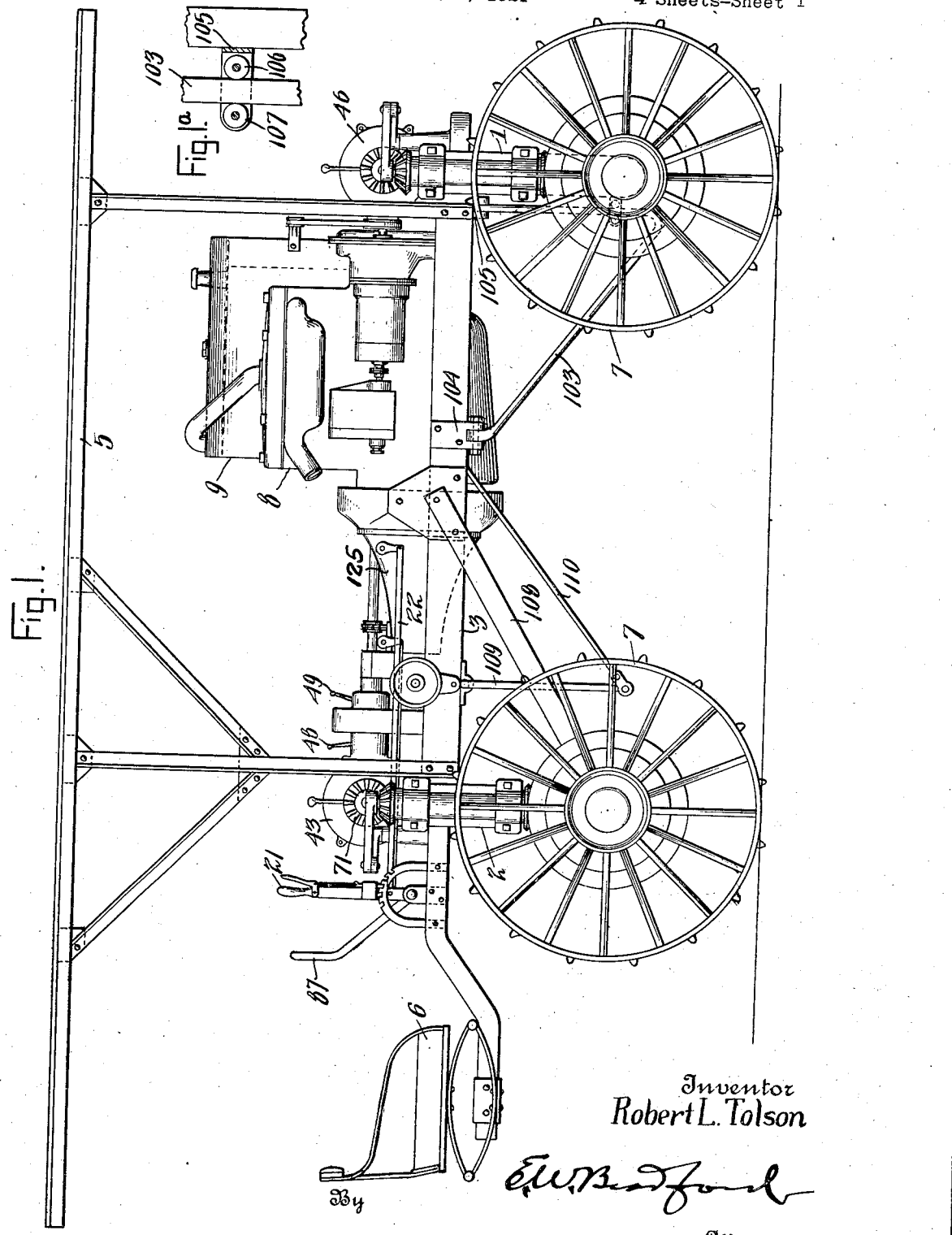

June 12, 1923.
R. L. TOLSON
TRACTOR
Filed Feb. 2, 1921
1,458,560
4 Sheets-Sheet 2
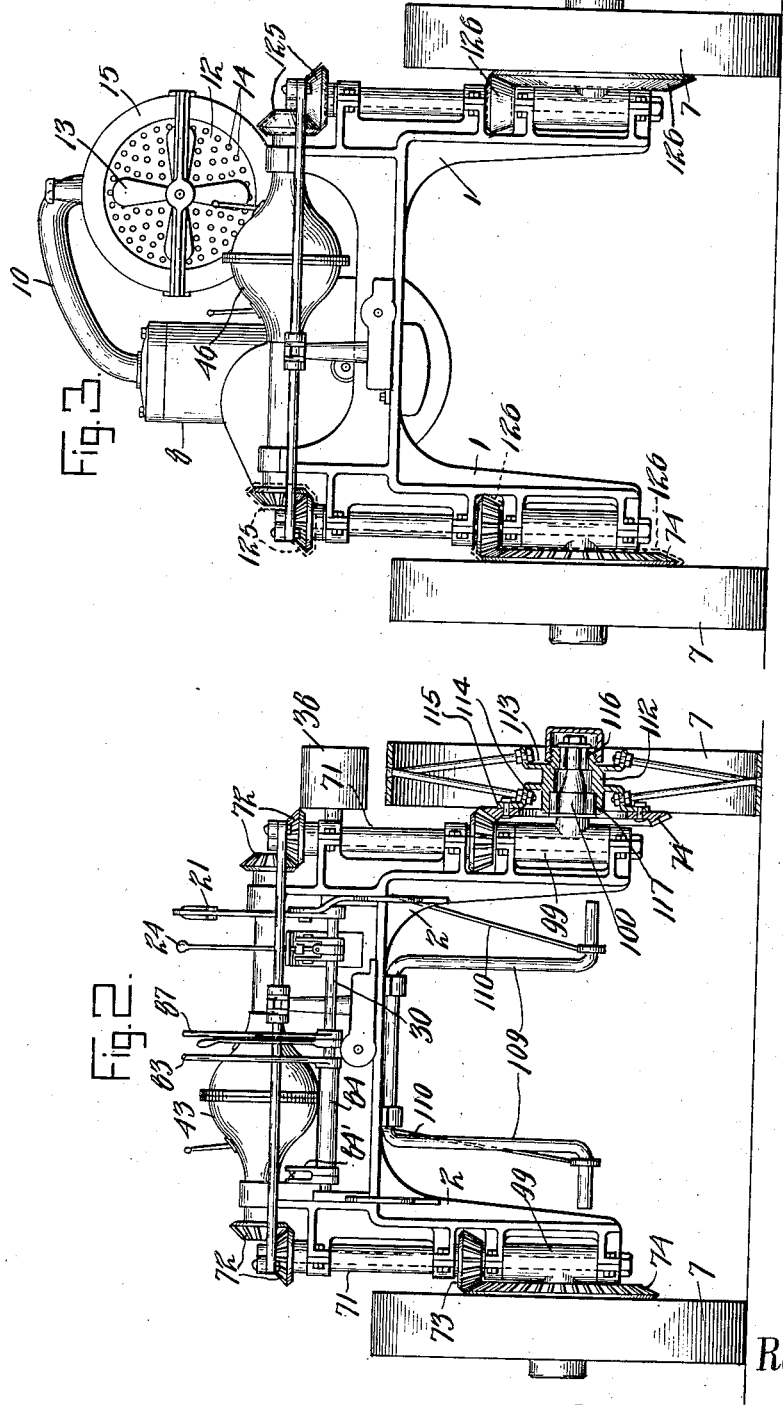
Inventor
Robert L. Tolson
By E.W. Bradford
Attorney

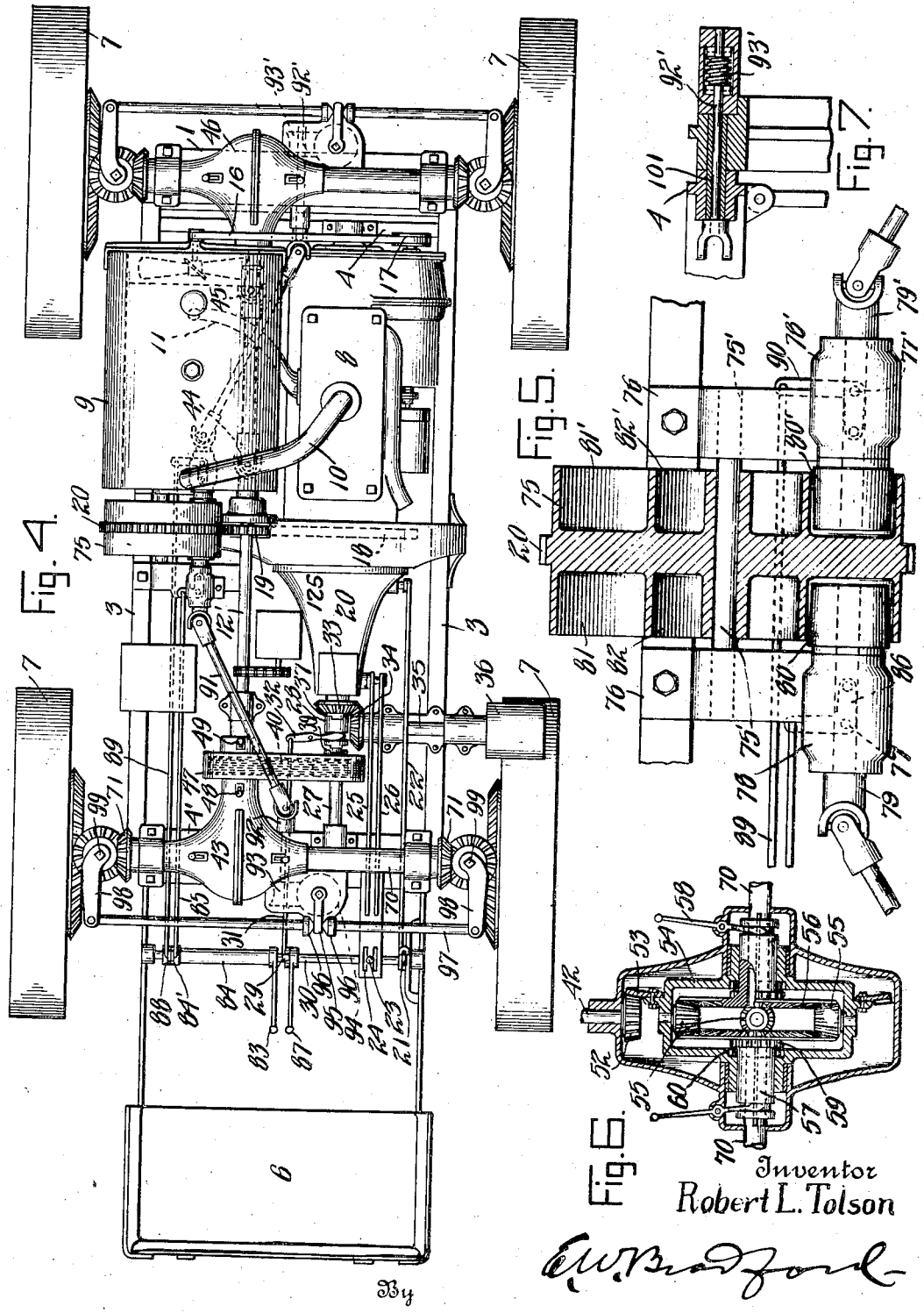

June 12, 1923.

R. L. TOLSON

TRACTOR

Filed Feb. 2, 1921

1,458,560

4 Sheets-Sheet 4

Inventor
Robert L. Tolson
By E.W. Bradford
Attorney

Patented June 12, 1923.

1,458,560

UNITED STATES PATENT OFFICE.

ROBERT L. TOLSON, OF MEMPHIS, TENNESSEE, ASSIGNOR, BY MESNE ASSIGNMENTS, TO JOHN W. FARLEY, TRUSTEE, OF MEMPHIS, TENNESSEE.

TRACTOR.

Application filed February 2, 1921. Serial No. 441,915.

*To all whom it may concern:*

Be it known that I, ROBERT L. TOLSON, a citizen of the United States, residing at Memphis, in the county of Shelby and State of Tennessee, have invented certain new and useful Improvements in Tractors, of which the following is a specification.

My said invention relates to improvement in tractors designed more particularly for use in farm work to replace draft animals and is adapted for use in drawing plows, cultivators, seeders, wagons, mowers, binders, road building machines, etc.

It is an object of my invention to provide a tractor in which all four wheels may be driven, or either the front set or the rear set by itself, the other set running idle, or if it becomes desirable to do so, any one wheel may be cut out.

Another object is to provide an improved steering gear for steering by either the front wheels or the rear wheels, or both sets simultaneously, as desired.

Another object is to provide an improved fuel tank and radiator.

Another object is to provide an improved differential gearing for both sets of wheels.

Another object is to provide a take-off pulley for power from the engine and means in connection therewith for starting the engine.

Another object is to provide means for tightening the chain between the engine and a power shaft to compensate for wear on the chain.

Another object is to provide an improved frame structure for a tractor, and an improved connection between the same and the front axle whereby the front axle may swing freely relatively to the frame.

Another object is to provide an improved traction wheel structure.

Referring to the accompanying drawings which are made a part hereof and on which similar reference characters indicate similar parts, Figure 1 is an elevation of my improved tractor, Figure 1ª is a detail of a brace for the front axle, Figure 2, a rear elevation, Figure 3, a front elevation,

Figure 4, a plan,

Figure 5, a section of the power steering mechanism in a horizontal plane.

Figure 6, a detail section through the differential gearing,

Figure 7, a vertical section through the kingbolt of the front axle, and

Figure 8, a plan of a modified steering means.

In the drawings similar reference characters indicate similar parts. The machine comprises a front arched axle 1, a rear arched axle 2 and a frame having side pieces 3, 3, and a front end 4, the rear axle 2 constituting the rear end of the main frame to which side pieces 3, 3 are fixed at their rear ends. The frame carries a canopy 5 and a driver's seat 6, an engine 8, a combined tank and radiator 9, and is supported on wheels 7.

The engine 8 for driving the tractor may be of any known type and is here shown as an oil-burning engine. Connected to it by pipes 10 and 11 is my combined fuel tank and radiator for cooling the water used to cool the engine. Figure 3 shows the device as consisting of a cooling tank 12 for the water from the engine jacket, the tank carrying a fan 13 at its forward end to drive air through the pipes 14 to aid in cooling the water passing from the engine through pipe 10, tank 12, and pipe 11 back to the engine. The fan 13 is driven by a belt 16 passing over pulley 17 geared to the engine shaft. Surrounding the tank 12 is an annular tank or jacket 15 for holding fuel oil, such as kerosene. In operation the heat of the water in the cooling tank or radiator will be taken up in part by the fuel oil, thus giving it a preliminary heating that causes it to be more readily volatilized in the carburetor. The oil is fed to the engine by any common or usual means (not shown).

On the flywheel of the engine or otherwise permanently attached thereto is a gear 18 which drives gear 20 through pinion 19 for a purpose hereinafter set forth. In a transmission casing 20 fast to the engine casing is the usual engine clutch operated by lever 21 through link 22 and also the usual change-speed gearing operated by lever 23 moving in H-slot 24 and connected to the gearing through links 25 and 26. The shaft 27 has thereon a sliding clutch member 28, which is operated by a lever 29 loosely mounted on shaft 30, which also carries levers 21 and 23. Lever 29 is connected by a link 31 and clutch-lever 32 to clutch member 28. The clutch member 28 being as shown in engagement with member 37 and the shaft 27 being clutched to the engine, it may transmit power through bevel gears 33 and 34, shaft 35 and pulley 36 to a belt, when the machine may be employed for obvious purposes as a stationary engine. In this position of parts I also propose to employ the pulley and connected devices for starting the engine, by affixing a crank 38 in any convenient manner to pulley 36.

In the other position of clutch member 28, shaft 27 will act through clutch member 39 and its connected gear, chain 40, a second gear driven by the chain, and the shaft 42 (Fig. 6) to drive the differential gearing in differential casing 43, and also through shaft sections connected to shaft 42' by universal joints 44 and 45, to drive the differential gearing in casing 46. Chain 40 is protected by a casing 47.

Within the casing 43 is a differential gearing comprising a pair of shafts 70, 70 driven from the shaft 42 either differentially or positively. Shaft 42 has a beveled gear 52 within the casing meshing with a ring gear 53 attached to the outside of the differential casing 54. This casing carries a pair of beveled pinions 55 having driving engagement with gears 56. Gears 56 have long hubs extending rearwardly, these hubs having grooves for engagement by shifting levers 58 and also having a ring of gear teeth at 59 immediately at the rear of the gears 56. The teeth 59 are adapted to mesh with corresponding teeth formed at 60 on the differential casing 54. The shifting levers may have yieldable detents engaging depressions in the casing to hold them in positions corresponding to those of hubs 57 where gears 56 engage pinion 55, or when the teeth 59 engage teeth 60, or when both sets of teeth on the hub are idle.

By means of this differential gearing I am enabled to drive the wheels of either set differentially or I may operate one of the levers 58 to disengage a gear 56 from its guiding pinions and engage teeth 59 with teeth 60. When this is done the shaft 42 will drive casing 54 and this will drive the corresponding shaft 70 positively through the hub 57 which is locked to casing 54 by the engagement of teeth 59 and 60. The opposed shaft 70 and the wheel driven thereby will stand still at this time, the pinions 55 rotating freely thereon as they are driven by casing 54. If, for example, a wheel at one side of the machine is sunk in the mud so that it can produce no driving effect I may in this manner disconnect that wheel and drive the other positively. I may also place both levers 58 of the front or rear set of wheels in idle position, thus permitting the set of wheels to be out of action, or may lock both front wheels or both rear wheels so that they would be positively driven if this were desirable.

Adjacent the casing 47 is a pair of levers 48 and 49 projecting from an extension of casing 43 which partly encloses a differential locking mechanism such as that shown in Figure 6, this third differential gearing being the connecting means between shafts 42 and 42' and being partly enclosed by casing 47. This differential enables the operator to drive both sets of wheels positively from the engine, or either set positively, when for example the other set is in a slippery place. Alternately both sets may be freed from the engine to permit the tractor to be drawn readily by propelling means other than its own power, if desired. In fact it is possible to drive any one wheel by itself should it become desirable for any reason to do so.

Shafts 70 mounted in bearings on the rear axle 2 drive shafts 71, 71 through bevel gears 72, 72. Shafts 71 are mounted in bearings on frame member 3 and carry at their lower ends bevel pinions 73, which mesh with bevel gears 74 on wheels 7 to drive the tractor. Except as above stated, the rear wheels and their power transmitting devices are identical with those of the front wheels and no separate description is considered necessary. It will be understood that in actual practice the various elements of gearing here shown as uncovered for greater clarity, will be enclosed in gear casings to protect them from sand and dirt.

For steering the machine I have provided power operated means whereby either the front wheels may turn by themselves or the rear wheels, or both according to the nature of the ground and the exigencies of the case. If a very short turn is to be made, for example to the right, then the front wheels will be turned to the right and the rear wheels to the left, or vice versa for a short turn to the left. They may also be off-set to travel in parallel but different tracks and thus cause the tractor body to assume a diagonal position if desired for any reason. The mechanism for producing these effects comprises the gear 20 driven from the engine through gears 18 and 19, and the drum 75 rotatable on shaft 75'. The gear is fixed to the drum or it may be integral therewith if desired. Mounted on brackets 76 on a frame member 4 are pivots 77, 77' for the casings 78, 78' which form bearings for shafts 79, 79' and are adapted to be swung to bring friction gears 80, 80' of paper or other suitable material into contact with either surface 81 and 82 of drum 75 according to the desired direction of drive. Casing 78 is adapted to be moved on its pivot 77 by lever 83 acting through sleeve 84 and rock arm 84' pivoted on shaft 30, link 85 and bell-crank 86, while casing 78' is moved on pivot 77' by lever 87 fixed to shaft 30 and turning it to move rock arm 88, link 89, and bell-crank 90.

Shaft 79 carrying gear 80 is connected by universal joints through shaft 91 to shaft 92 bearing a worm 93 in mesh with worm gear 94 on a shaft having a rock arm 95 between two cones 96, 96 on rod 97 connected at its ends to rock arms 98, 98 on shafts 99, 99 extending down through hollow shafts 71, 71 and each journaled at its lower end in bearings on rear axle 2. Each shaft 99 has near its lower extremity a sleeve fixed thereto carrying a projecting stub-shaft 100 on which is mounted by means of anti-friction bearings, a wheel 7. The gear 80' is similarly connected to the front wheels and it will be evident that whenever the engine is running, it is necessary only to move one of the gears 80, 80' into engagement with a surface on drum 75 to cause the wheels to turn to one side or the other while if both gears are thrown into engagement a very short turn may be made, or sidewise or diagonal movement may be had as desired.

The shaft 92' (Figure 7) of the steering means for the front end of the machine passes through a pivot member or king-bolt 101 forming a horizontal pivot for the frame member 2. This member 101 passes through the frame member 4 fast to side members 3, 3. The members 2, 3, 3, and 4 form thus a rigid rectangular frame whose relative horizontal position depends on the nature of the ground passed over by the rear wheels, while the front wheels are free to swing about the pivot 101. Racking and distortion of the frame of the tractor in passing over rocky ground is thus prevented, the machine in actual practice being so constructed that a front wheel may pass over a log more than 12 inches thick or fall into a rut more than 12 inches deep without appreciable effect on the frame. One advantage of this is that one of the front wheels can readily drop into a furrow, as in plowing, without any effect on the frame or the plows attached thereto.

To prevent twisting of the front frame member 2, by which the kingbolt might be bent or broken off, there is provided at each side of the frame an angular member 103 having one end pivoted to the side frame at 104, and the other at 105. The intermediate portion extends straight down alongside the member 1 and thence at an acute angle upwardly to the bracket 104. Frame 1 is held squarely at the front of the tractor by braces 103, the frame carrying brackets 105 provided with rollers 106 and 107 respectively in front and rear of the vertical arm of the member 103.

Braces 108 extending diagonally from side frame members 3, 3 to rear axle 2 serve to brace this part of the machine against strain.

For attachment of farm implements or the like a member 109 is provided under the frame, having braces 110 to hold it rigid, or a draw-bar may be attached to the rear frame, as in my prior Patent No. 1,323,126.

It will be noted that the front and rear frame members are of arched form so as to straddle rows of corn, cotton, etc., without injury to the crops. These members are each composed of a single piece of cast steel, and each acts not only as a supporting member for the tractor but also has formed integral therewith portions of four bearings at each side and two at the top and one entire bearing in the cross-portion to support the steering and driving connections.

The hubs of the wheels 7 are each made in one piece having a body portion 112 a bent flange 113 extending therefrom for attachment of outer spokes, and a similar flange 114 for attachment of inner spokes, said flange having a reflexed portion 115 to which is attached by bolts or other conventional means, a wheel 74, preferably supporting the axle by means of roller bearings 116 and 117.

In Figure 8 I have shown a modified form of my steering mechanism, all other parts being as in the previously-described figures. The shaft 91' in this construction corresponds to shaft 91 in Figure 1 and is connected at its rearward end, which is carried to one side of the machine, to a shaft 118 rotatable in a bearing 119 and having at its rear end a steering wheel 120. At its forward end shaft 91' is connected to a shaft 121 which steers the front wheels as in Figure 4.

For steering the rear wheels I provide a second steering wheel 122 having a shaft 123 connected by sprocket gearing 124 to a shaft 92' similar to shaft 92 in Figure 4 and steering the rear wheels by similar means.

The organization of parts comprising my tractor is simple and not liable to get out of order; the parts are to a great extent interchangeable, and it is necessary to keep on hand only a very few gears and other parts most liable to injury, to be practically insured against serious loss of time due to a breakdown of the tractor.

Numerous modifications other than those above disclosed will occur to those skilled in the art and I do not restrict myself to what is shown on the drawings, the true scope of the invention being set forth in the appended claims.

For example, I may in some instances substitute braces such as shown at 103 for braces 108 of the rear axle, the roller bearings being very desirable if there is any relative movement of parts. I preferably cover all exposed gears with housings or casings as shown in Figure 3 at 125 and 126, this being imperatively necessary in very sandy or muddy country.

It may be noted that owing to the equal distribution of weight each wheel carries about the same burden this making the tractor very stable and unlikely to turn over, and preventing undue cutting up of the soil in running on wet sod or the like. Every wheel being driven, the even distribution of weight also renders the driving means more effective, as every pound of weight helps to hold the traction wheels to their work.

It will be seen that in the use of my device the front and rear sets of wheels may be offset in such a manner that the front wheels will straddle one row of corn or other crop while the rear wheels straddle another row. This peculiarity of structure finds its utility in getting around mud holes and rocks or other obstacles in the road or in the field, the offset relation being produced by turning the steering wheels in Figure 8 in opposite directions or by proper positioning of gears 80, 80' in Figure 5.

Having thus fully described my said invention, what I claim as new and desire to secure by Letters Patent, is:

1. In a tractor, a power operated steering device comprising an engine shaft extending lengthwise of the tractor, a drum having its axis parallel to said shaft, gears on the shaft and drum, a gear intermediate of and engaging said gears, a gear having its axis parallel to that of the drum, inner and outer flanges on the drum adapted to be engaged by said gear, means connecting said gear to the steering wheels of the tractor, and means under control of the operator whereby said gear may be moved into engagement with the said drum, substantially as set forth.

2. In a tractor, a power operated steering mechanism comprising a drum, positive driving means connected to the engine, a pair of friction gears adapted to engage said drum alternately, one of said gears having means connected thereto for steering the front wheels of the tractor and means connected to the other of said pair of gears for steering the rear wheels, substantially as set forth.

3. In a tractor, a power driven steering mechanism comprising a drum, means between the drum and the engine for driving said drum, a pair of gears adapted to be engaged with the drum either alternately or simultaneously, means connected to one of said gears for steering the rear wheels and means connected to the other of said gears for steering the front wheels, substantially as set forth.

4. In a tractor, a power operated steering mechanism comprising a drum, means connected to the engine for driving said drum, a pair of gears adapted to engage said drum alternately or simultaneously to be driven thereby, pivotally mounted shafts carrying said gears, means connected to said shafts for steering the front and rear wheels respectively and means adjacent the rear of the machine for swinging said pivotal shafts to move the gears into and out of engagement with the drum, substantially as set forth.

5. In a tractor, a power operated steering mechanism comprising a drum adapted to be driven from the engine, said drum having a pair of annular friction surfaces, a pair of friction gears adapted to be moved into engagement with said surfaces and means connected to said friction gears respectively for steering the front and rear wheels of the tractor, substantially as set forth.

6. In a tractor, an inverted U-shaped axle, wheels on said axle, gears fixed to said wheels, vertical shafts for steering said wheels journaled in the side portions of said U-shaped axle, gears on said shafts engaging those on the wheels, rockarms on said shaft, a rod connected to the two rockarms, a shaft having a rockarm connected to said rod for steering said wheels, a worm gear on the latter shaft, a worm for driving the same, a shaft journaled in the transverse part of the axle and carrying said worm wheel, and power operated means for moving said shafts, substantially as set forth.

7. In a tractor, a main frame, an inverted U-shaped axle for supporting the frame, a horizontal king-bolt extending through the transverse part of the U-shaped axle, a shaft journaled in said king-bolt, means connected to one end of said shaft and to the steering wheels for swinging the latter including a worm on the shaft, an upright shaft, a worm wheel thereon driven by said worm, a rock arm on the shaft, a transverse rod connected to the rock arm and the steering wheels, and power operated means connected to the other end of the shaft, substantially as set forth.

8. In a motor vehicle, a main frame, an axle pivoted thereto by a horizontal pivot, a rod having a portion extending vertically adjacent the axle and slidably connected thereto near its lowest point and swingably secured to the main frame at a distance from the axle, substantially as set forth.

9. In a motor vehicle, a main frame, an axle pivoted thereto by a horizontal pivot, a rod attached to the main frame by a pivot parallel to that of the axle, said rod having a portion thereof extending vertically adjacent the axle and slidably connected thereto, substantially as set forth.

10. In a motor vehicle, a main frame, bent rods having their ends pivotally attached to the sides of the frame, a U-shaped axle pivotally attached to an end of the frame and slidable connections between the lower portions of the axle and parallel portions of said rods, substantially as set forth.

11. In a vehicle, a main frame, an axle having a depending portion and a rod attached at its rear end to the frame and having a portion adjacent the lower end of the axle and slidably connected thereto, substantially as set forth.

12. In a vehicle, a main frame, an axle pivotally connected thereto and having depending portions, braces attached at their rear ends to the frame and at their forward ends having sliding connections with the lower parts of the axle, substantially as set forth.

13. In a motor vehicle, a main frame, an inverted U-shaped axle pivoted thereto by a horizontal pivot, a rod attached to the main frame by a pivot parallel to that of the axle, said rod having a portion thereof extending vertically adjacent the axle and slidably connected thereto, substantially as set forth.

14. In a tractor, front and rear sets of wheels, a transmission shaft extending lengthwise of the tractor and connected to both sets of wheels, an engine shaft parallel to the transmission shaft and geared thereto, a drum on an axis parallel to said shaft, a spur gear loose on the transmission shaft, spur gears on the drum and the engine shaft meshing with said first-named spur gear, and means for steering said wheels selectively from said drum, substantially as set forth.

In witness whereof, I have hereunto set my hand and seal at Memphis, Tennessee this 22nd day of January, A. D. nineteen hundred and twenty-one.

ROBERT L. TOLSON. [L. S.]

Witnesses:
  JOHN W. FARLEY,
  F. M. BAILEY.